Patented Apr. 27, 1943

2,317,756

UNITED STATES PATENT OFFICE 2,317,756

PROCESS FOR IMPROVING MATERIALS CONTAINING CELLULOSE

Charles Graenacher, Riehen, and Richard Sallmann, Bottmingen, Switzerland, assignors to the firm Society of Chemical Industry in Basle, Basel, Switzerland No Drawing. Application September 28, 1940, Serial No. 358,924. In Switzerland May 5, 1938

8 Claims. (Cl. 8—116)

This invention relates to improving cellulose or materials containing cellulose by treating the material with a carboxylic acid methylolamide in which the carbonyl group is attached to an active residue free from basic nitrogen atoms by a carbon to carbon linkage, heating the thus treated material and if desired subjecting the active residue of the carboxylic acid methylolamide to a further reaction.

As carboxylic acid methylolamides in which the carbonyl group is bound to a reactive residue by a carbon to carbon linkage there come into question for example methylolamides of aliphatic, aromatic, mixed aliphatic-aromatic, cycloaliphatic or heterocyclic carboxylic acids which contain at least two carbon atoms linked together and at least one reactive group. As active groups the carboxylic acids from which the methylolamides are derived may contain reactive atoms, for instance halogen atoms, hydrogen atoms capable of exchange or reactive atom groups free from basic nitrogen atoms, for example hydroxy groups or acid groups, for instance carboxyl-, sulfonic acid or sulfuric acid ester-groups and salts thereof. Such carboxylic acid methylolamides are for instance methylolchloracetamide, β-chloropropionic acid methylolamide, α-bromopropionic acid, α-bromo-butyric acid methylolamide, α-bromolauric acid methylolamide, chloro-succinic acid dimethylolamide, para-chloromethyl-methylolbenzamide, methylolamides of naphthenic acids and resin acids which contain halogen atoms capable of exchange. There may also be used N-methylol derivatives of dicarboxylic acid-semi-amides, for example the semi-amides of phthalic acid, hexahydrophthalic acid, naphthalic acid, quinolinic acid, maleic acid, adipic acid, or sulfophthalic acid.

The carboxylic acid methylolamides used in the invention are either known or may be made without further direction by processes analogous to the known processes for making such compounds.

The action of the carboxylic acid methylolamides on the cellulose or material containing cellulose may be effected with advantage by impregnation of the material to be treated with a solution or dispersion of methylolamide advantageously in presence of a catalyst such as dilute acid or an acid salt, and subsequent treatment at a raised temperature. As solvent or dispersing agents water is particularly useful especially for the methylolamides of low molecular weight. However there may also be used organic solvents, pyridine, dimethylaniline, dioxane or the like. Dispersions for the purpose may be made by known methods.

As acid catalysts there may be used for instance formic acid, acetic acid, oxalic acid, urea nitrate, potassium-bisulfate, lactic acid, glycollic acid. It may be of advantage to add formaldehyde to the treating bath.

It is further possible to produce the methylolamide during the treatment of the cellulose material by using a treating bath which contains the carboxylamide and formaldehyde, as well as, if desired, a catalyst such as a weak acid. The cellulose material which has been impregnated with the solution or dispersion of the methylolamide is then optionally dried at a low temperature and afterwards heated to a high temperature of for instance 110° C.

After the treatment with methylolamide the cellulose or cellulosic material may be subjected to the reaction which is to change the reactive group present in the methylolamide used, for example a halogen atom or a sulfuric acid ester group; for this purpose the goods are treated with for instance ammonia, a primary, secondary or tertiary amine, for example methylamine, mono-ethanolamine, diethanolamine, trimethylamine, triethylamine, triethanolamine, pyridine, dimethylaniline or the like in known manner at ordinary or raised temperature. The compounds just mentioned (ammonia, primary, secondary or tertiary amines) may be regarded as compounds which contain a basic nitrogen atom.

The cellulose derivatives obtained for example with the aid of halogen carboxylic acid methylolamide on the one hand and a basic nitrogen compound on the other hand have basic properties and may consequently be dyed deep fast tints with acid dyestuffs such as acid wool dyestuffs or by acid dyestuffs which contain metal in complex union, mordant dyestuffs, sulfuric acid ester salts of vat dyestuffs, dyestuff esters or dyestuff amides such as are described in U. S. patent applications, Serial No. 92,244, filed July 23, 1936, now Patent No. 2,170,262 and No. 173,528, filed November 8, 1937, now Patent No. 2,235,480, as well as in Patents 2,120,741 and 2,095,600. Also dyestuff intermediate products of an acid character are absorbed by such basic cellulose derivatives. Direct dyestuffs yield on basic cellulose derivatives made by this invention generally dyeings which are faster than those produced on untreated cellulose which in all probability is due to a salt formation. The acid dyestuffs absorbed by the basic cellulose derivatives may when their constitution permits be diazotized on the fiber and developed in usual manner by means of azo-components. Furthermore suitable dyestuffs may be treated on the fiber with diazonium compounds.

Similarly to acid dyestuffs and their intermediate products other compounds of an acid nature may be absorbed by the basic cellulose derivatives in question, for example fatty acids, resin acids, naphthenic acids, sulfuric acid esters of fatty alcohols of high molecular weight or of hydroxy fatty acids and their esters; also sulfonic acids of high molecular weight which in addition to an aliphatic or cycloaliphatic radical of high molecular weight contain an external sulfonic acid group, for instance cetylsulfonic acid, oleyloxy-ethane-sulfonic acid, N-oleyl-N-methyl-amino-ethane-sulfonic acid, N-benzyl-$\mu$-heptadecylbenzimidazole disulfonic acid, sulfophthalic acid, mono-octadecyl ester and their salts. By suitable selection of the components there may be produced in this manner a surprisingly soft feel in the goods. If the methylolamides used in the invention contain reactive acid groups, for example carboxyl groups, one may obtain by the treatment of cellulose materials with such carboxylic acid methylolamides cellulose derivatives of an acid nature which may react for example with amines containing aliphatic or cycloaliphatic residues of high molecular weight. By the reaction with basic nitrogen compounds of high molecular weight there may be obtained in many cases a surprisingly softer feel in the treated cellulose materials.

In the present process a chemical reaction between the cellulose and the carboxylic acid methylolamide group of the compounds applied takes place in all probability during the heating operation. The constitution of the cellulose materials obtained by the present invention could not be explained. The treated fibrous materials can therefore only be characterized by their process of manufacture.

As cellulose or material containing cellulose there may be used for example cotton, viscose artificial silk, copper artificial silk, paper, mixtures of cellulose with other fibers such as wool, for example in the form of threads or fabrics.

It is frequently of advantage first to subject the material to be treated to a cleansing operation or to de-size the fibers or fabric.

This application is a continuation-in-part of our application Serial No. 270,918, filed April 29, 1939, now Patent No. 2,270,520.

The following example illustrates the invention:

*Example*

Cotton cloth is handled for 15–30 minutes in an aqueous solution of 10–20 per cent strength of methylolchloracetamide containing 0.5 per cent of formic acid, at a temperature of 30–40° C.; the cloth is then squeezed and dried at 50–60° C. and then heated for 4 hours at 110–115° C. The material is rinsed in boiling hot water, centrifuged and while moist or after drying immersed in pyridine at 60–80° C. After the pyridine has acted for one half to 1 hour, the cloth is squeezed and again rinsed in boiling hot water and dried.

The fabric thus treated has a pronounced capacity for being dyed by acid wool dyestuffs.

A similar result is obtained if instead of the methylolchloracetamide as parent material the $\beta$-chloropropionic acid methylolamide, the $\alpha$-bromopropionic acid methylolamide, the $\alpha$-bromolauric acid methylolamide or the 4-$\mu$-chloromethylmethylolbenzamide is used.

In the same manner, and with equal success, another tertiary amine such as trimethylamine, may be used in place of pyridine.

What we claim is:

1. A process for improving materials containing cellulose, which comprises treating the materials with a methylolamide of a halogenated carboxylic acid, drying the thus treated materials, heating them, and further treating them with a compound containing at least one basic nitrogen atom.

2. A process for improving materials containing cellulose, which comprises treating the materials with a methylolamide of an aliphatic halogenated carboxylic acid containing less than 5 carbon atoms, drying the thus treated materials, heating them, and further treating them with an amine.

3. A process for improving materials containing cellulose, which comprises treating the materials with methylolchloracetamide, drying the thus treated materials, heating them, and further treating them with a tertiary amine.

4. A process for improving materials containing cellulose, which comprises treating the materials with methylolchloracetamide, drying the thus treated materials, heating them, and further treating them with pyridine.

5. A process for improving materials containing cellulose, which comprises treating the materials with methylolchloracetamide, drying the thus treated materials, heating them, and further treating them with trimethylamine.

6. A process for improving materials containing cellulose, which comprises treating the materials with $\beta$-chloropropionic acid methylolamide, drying the thus treated materials, heating them, and further treating them with pyridine.

7. Cellulose materials having basic properties and obtained by the process which comprises treating cellulose materials with a methylolamide of a halogenated carboxylic acid, drying the thus treated materials, heating them, and further treating them with a compound containing at least one basic nitrogen atom and at least two hydrogen atoms connected with the basic nitrogen atom.

8. Cellulose materials having basic properties and obtained by the process which comprises treating cellulose materials with a methylolamide of an aliphatic halogenated carboxylic acid containing less than 5 carbon atoms, drying the thus treated materials, heating them, and further treating them with a primary amine.

CHARLES GRAENACHER.
RICHARD SALLMANN.